Aug. 5, 1958 R. W. SPENCER 2,846,524
MAGNETIC AMPLIFIER CIRCUIT WITH OUTPUTS OF OPPOSITE PHASE
Filed Feb. 7, 1955
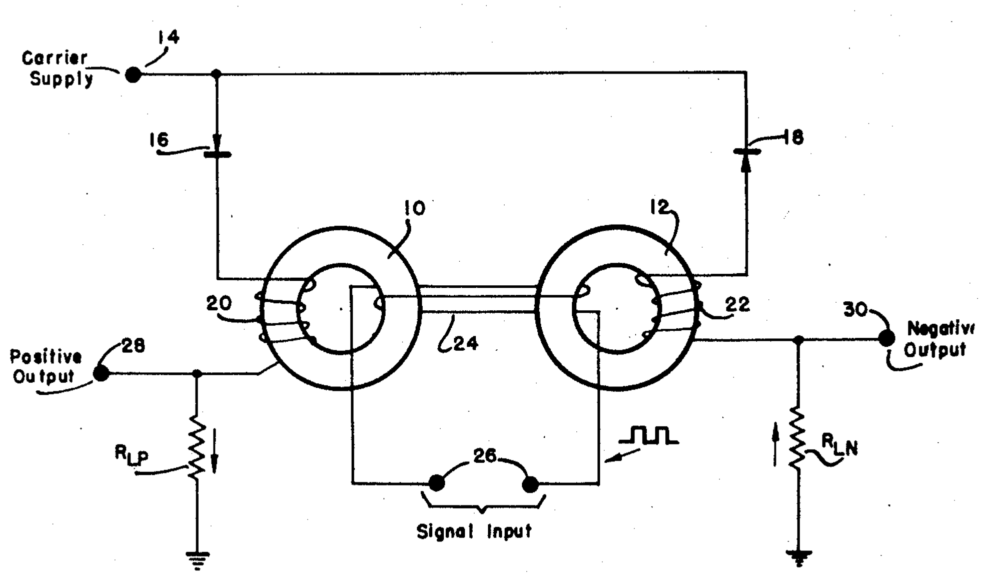
INVENTOR
RICHARD W. SPENCER
BY Charles C. English
AGENT

United States Patent Office 2,846,524

Patented Aug. 5, 1958

2,846,524

MAGNETIC AMPLIFIER CIRCUIT WITH OUTPUTS OF OPPOSITE PHASE

Richard W. Spencer, Philadelphia, Pa., assignor, by mesne assignments, to Sperry Rand Corporation, New York, N. Y., a corporation of Delaware Application February 7, 1955, Serial No. 486,470

1 Claim. (Cl. 179—171)

The present invention relates to magnetic amplifier circuits and more particularly to a two core carrier type magnetic amplifier with outputs of opposite phase.

Carrier type magnetic amplifiers assume numerous and diverse forms. A typical embodiment may comprise a pair of magnetic cores carrying a pair of power windings, a pair of rectifiers connected similarly to the power windings, and a power transformer coupling a source of carrier potential to the circuits including the rectifiers and power windings. A load impedance is normally connected to the power winding circuits, and the cores carry one or more signal windings coupled to a source of signal potential. The windings on the respective cores may be so interconnected that in the normal course of operation energy coupled to one of the cores during a half cycle of carrier potential is also coupled to the other core to condition the latter preparatory to the coupling of power thereto in the next half cycle of carrier potential.

As is known in the art, the amplifier may be adjusted so that in the absence of a signal input thereto the output voltage will be a minimum. For optimum operation, the amplitude of the carrier potential may be adjusted so that each core will traverse its entire hysteresis loop during one half cycle of carrier potential. In the circuit of the present invention, outputs are provided which have, respectively, the same polarity and the opposite polarity with respect to the input signal.

Accordingly, an object of the invention is to provide a novel magnetic amplifier circuit.

A further object of the invention is to provide a novel magnetic amplifier circuit of the carrier type.

Another object of the invention is to provide a novel magnetic amplifier circuit which makes available both positive and negative outputs.

An additional object of the invention is to provide a unique magnetic amplifier phase inverter.

The foregoing objects of the invention may be realized by providing a pair of magnetic cores with one or more signal windings, a pair of power windings, a pair of load impedances connected to said power windings, and a pair of rectifiers connected respectively in the power winding circuits. A source of carrier potential is connected to the power winding circuits, and the latter are arranged so that during one half cycle of carrier potential, current flows in one load impedance in a first direction and during the next half cycle of carrier potential, current flows in the other load impedance in the opposite direction. The foregoing and other objects of the invention will become more readily apparent by reference to the following detailed description of the invention taken in conjunction with the accompanying drawing, wherein:

The circuit illustrated is a preferred form of the invention.

Referring to the drawing, reference numerals 10 and 12 designate, respectively, a pair of magnetic cores, which preferably, but not necessarily, are formed from a material exhibiting a substantially rectangular hysteresis loop. Such cores may be made from a variety of materials, among which are the various types of ferrites and various kinds of magnetic tapes, including Orthonik and 4–79 Moly-Permalloy. These materials may be heat-treated to produce desired properties. The cores may be constructed in a number of geometrical configurations, including both closed and open paths. Cup-shaped cores, strips of material, or toroidal cores may be used; but it is to be understood that the present invention is not limited to a specific core form or to a specific hysteresis loop configuration.

Power may be supplied to the amplifier from a carrier frequency supply connected between terminal 14 and ground. Terminal 14 is connected to a pair of rectifiers 16, 18, which may be constituted by any of the conventional rectifiers, including crystal diodes and vacuum tubes. As indicated, the rectifiers are connected to terminal 14 with opposite polarity.

Core 10 carries a power winding 20, one end of which is connected to rectifier 16 and the other end of which is connected to a load impedance $R_{LP}$. Core 12 carries a power winding 22 connected similarly to rectifier 18 and to the load impedance $R_{LN}$. The other ends of the load impedances may be grounded, as illustrated, so as to complete a pair of series circuits, including respectively the carrier supply, rectifiers 16, 18, power windings 20, 22, and load impedances $R_{LP}$ and $R_{LN}$.

Cores 10 and 12 also carry a signal winding 24, which may be constituted by a single coil wound on both cores, as illustrated, or which may comprise separate coils connected in series. The ends of the signal coil 24 are connected respectively to terminals 26, which constitute signal input terminals. One of the input terminals may be grounded. A suitable input impedance (not shown) may be connected either in series with or in shunt with terminals 26. In addition, a bias supply (not shown) may be connected in the input circuit or coupled to cores 10 and 12 in other manners well known per se in the art. Positive and negative output terminals 28, 30, respectively, may be connected to the associated load impedances, as illustrated.

In the operation of the invention, and assuming that core 12 is initially at its positive remanence operating point, while core 10 is initially at its minus remanence point, when the carrier potential at terminal 14 becomes positive with respect to ground, current will flow from the carrier source through rectifier 16, coil 20, and load impedance $R_{LP}$, inducing a potential in coil 24 and causing core 12 to revert to negative remanence. During the next half cycle of carrier potential, when the voltage at terminal 14 is negative with respect to ground, the current flowing through rectifier 18 and coil 22 will find core 12 in its said reverted condition and will drive the same positively along an unsaturated portion of its hysteresis curve, whereby coil 22 exhibits a high impedance and only a small current flows in load $R_{LN}$. Since core 12 is being driven along an unsaturated portion of the hysteresis curve, there will be a large rate of change of flux, and a large potential will be induced in coil 24, thereby reverting core 10 to a negative remanence condition. On the next half cycle of carrier potential (terminal 14 again becoming positive with respect to ground), the positive pulse flowing through rectifier 16 and coil 20 will drive core 10 along an unsaturated portion of its hysteresis curve, thereby inducing a potential in winding 24, which will revert core 12 as above. Coil 20 has high impedance to the flow of current therethrough from terminal 14; hence, the current to load $R_{LP}$ is small. Potential induced in coil 24 may effect a current flow through the input circuit, which is assumed to have sufficiently low resistance to enable that result to occur. Hence, as long as there is no signal at input terminals 26, coils 20 and 22 will each have high impedance, and there will be substantially no current through the loads. While a small current in fact flows through $R_{LP}$ and $R_{LN}$ during the above described circuit operation, the output potentials at terminals 28 and 30 are relatively small, and these potentials may, if desired, be completely suppressed by appropriate clamp means.

If, however, an input signal appears at input terminals 26, this signal will oppose the reverting effects of the induced currents in coil 24, and both cores 10 and 12 will be driven to saturation by the current pulses flowing through coils 20 and 22 from the carrier supply 14, whereby coils 20 and 22 will thereafter exhibit low impedances and appreciable currents will readily flow therethrough to the respective loads. The currents flowing in the respective load impedances will have directions so as to produce in said impedances potentials of opposite polarity, whereby the device shown acts as a carrier type magnetic amplifier having a bipolar output, such as may be utilized in phase or polarity inversion applications. The output potentials at terminals 28, 30, may, if desired, be filtered to remove carrier frequency components. In this respect, therefore, the term "carrier frequency" as employed herein, denotes a frequency in excess of approximately three to five times the intelligence or signal frequency, as is usually understood in the electrical arts, i. e. the carrier frequency is sufficiently higher than the highest intelligence frequency to allow the carrier and intelligence frequencies to be readily separated by a detector and filter circuit.

The preferred embodiment illustrated may be conveniently employed in the amplification of pulses, as well as in signal amplification and phase or polarity inversion applications. The circuit has the positive feedback inherent in the so-called "self-saturating" amplifier circuits, and voltages induced in the input winding are second and higher harmonics of the carrier supply frequency.

While a preferred embodiment of the invention has been shown and described, it is to be understood that this embodiment is illustrative only and is not meant to be restrictive of the invention. Many variations will be suggested to those skilled in the art and such variations which are in accordance with the principles of the invention, are intended to fall within the scope of the following claim.

I claim:

In a magnetic amplifier circuit, the combination of; first and second magnetic cores, an alternating current carrier wave source, first means including a coil wound on said first core for coupling said core to said carrier wave source to produce a flux in said core in a first direction during the half cycles of one sense of said carrier wave source, second means including a coil wound on said second core for coupling said core to said carrier wave source to produce a flux in said second core in a first direction during the other half cycles of the alternating current source, and signal winding means linking said first and second cores and wound in such direction that the flux produced in said first core by said one-half cycles of one sense of carrier current produces flux in a second direction opposite to said first direction in said second core and the flux produced in said second core by said other one-half cycles of carrier current produces flux in a second direction opposite to said first direction in said first core, a signal control input means coupled to said signal winding means for selectively applying a signal input current into said winding means in opposition to the currents induced in said winding means by the flux produced in said cores by successive half-cycles of carrier current through said first and second coil means, first and second load impedances connected respectively to said first and second coil means, an output signal of first polarity appearing across said first load impedance and an output signal of opposite polarity appearing across said second load impedance when said signal control input means is operative to apply signal current to said signal winding means, and substantially no output signals appearing across either of said load impedances when said control means is inoperative.

References Cited in the file of this patent

UNITED STATES PATENTS

| | | |
|---|---|---|
| 2,229,952 | Whiteley et al. | Jan. 28, 1941 |
| 2,259,647 | Logan | Oct. 21, 1941 |

OTHER REFERENCES

Wm. A. Geyger; "Magnetic Amplifier Circuits," pp. 175, 176 (Fig. 12.2), published by McGraw-Hill Book Co., Inc., January 29, 1954.